ized Examiner—Michael V. Mar
United States Patent
Stanciu

[15] 3,698,640
[45] Oct. 17, 1972

[54] WAX INJECTION NOZZLE
[72] Inventor: Virgil V. Stanciu, Rocky River, Ohio
[73] Assignee: Tempcraft Tool & Mold, Inc., Cleveland, Ohio
[22] Filed: July 14, 1971
[21] Appl. No.: 162,480

[52] U.S. Cl. ...................239/187, 239/456, 425/145
[51] Int. Cl. ..............................................B05b 3/18
[58] Field of Search......239/184, 186, 187, 451, 581, 239/582, 456; 425/145, 166, 167, 245

[56] References Cited
UNITED STATES PATENTS

| | | | |
|---|---|---|---|
| 3,632,259 | 1/1972 | Stanciu | 425/245 |
| 3,632,260 | 1/1972 | Mosio | 425/245 |

Primary Examiner—M. Henson Wood, Jr.
Assistant Examiner—Michael V. Mar
Attorney—Baldwin, Egan, Walling & Fetzer

[57] ABSTRACT

A nozzle assembly for injecting a flowable and moldable material, such as hot wax, into a die has an elongated generally cylindrical housing having a discharge nozzle at one end controlled by a valve in the housing which is frusto-conical converging toward the nozzle and seated against a complementary frusto-conical seat. The valve plug has a piston rod extending rearwardly axially of the housing and terminating in a piston housed in a tubular cylinder with pressure fluid means for causing movement of the piston to open and close the valve. An adjustable stop is provided at the rear end of the housing against which an extension of piston engages to limit opening movement of the valve. The housing is adapted to be assembled in a reservoir full of hot wax under pressure which enters through an opening in the housing when the valve is open so as to flow through the nozzle to a mold die. The complete housing is movable endwise through the hot wax reservoir to and from the die to be injected. The means for doing this comprises a piston on the housing which is encased in a tubular cylinder with means provided to apply pressure fluid against one or the other faces of this piston to move the entire housing lengthwise.

12 Claims, 8 Drawing Figures

PATENTED OCT 17 1972

INVENTOR.
VIRGIL V. STANCIU
BY
Baldwin, Egan, Walling & Fetzer
ATTORNEYS

WAX INJECTION NOZZLE

In injecting hot wax into molds or dies considerable flexibility must be provided so that turbulent injection flow, generally causing pattern surface defects such as ripples, flow lines, splash, and entrapped air bubbles, can be minimized. This is made possible in the novel nozzle assembly of this invention by providing injection flow control means such that conditions may be carefully set depending upon the size of the mold to be filled, the temperature and pressure of the hot wax and other injection conditions.

An object of the present invention, therefore, is to provide the controls for exact repeatability of wax injection flow characteristics such as the wax flow and the wax flow acceleration rates which are essential for the control of turbulent flow. This is provided in the present invention by nozzle design and by the smoothly controlled movement of the nozzle after the conditions have been properly selected by the operator.

Other objects and advantages of the present invention will be apparent from the accompanying drawings and description and the essential features thereof will be set forth in the appended claims.

In the drawings,

FIGS. 2 and 2A are central vertical longitudinal sections through the complete nozzle assembly of this invention;

FIG. 6 is a diagrammatic illustration of various wax flow curves; while

Figure 1:
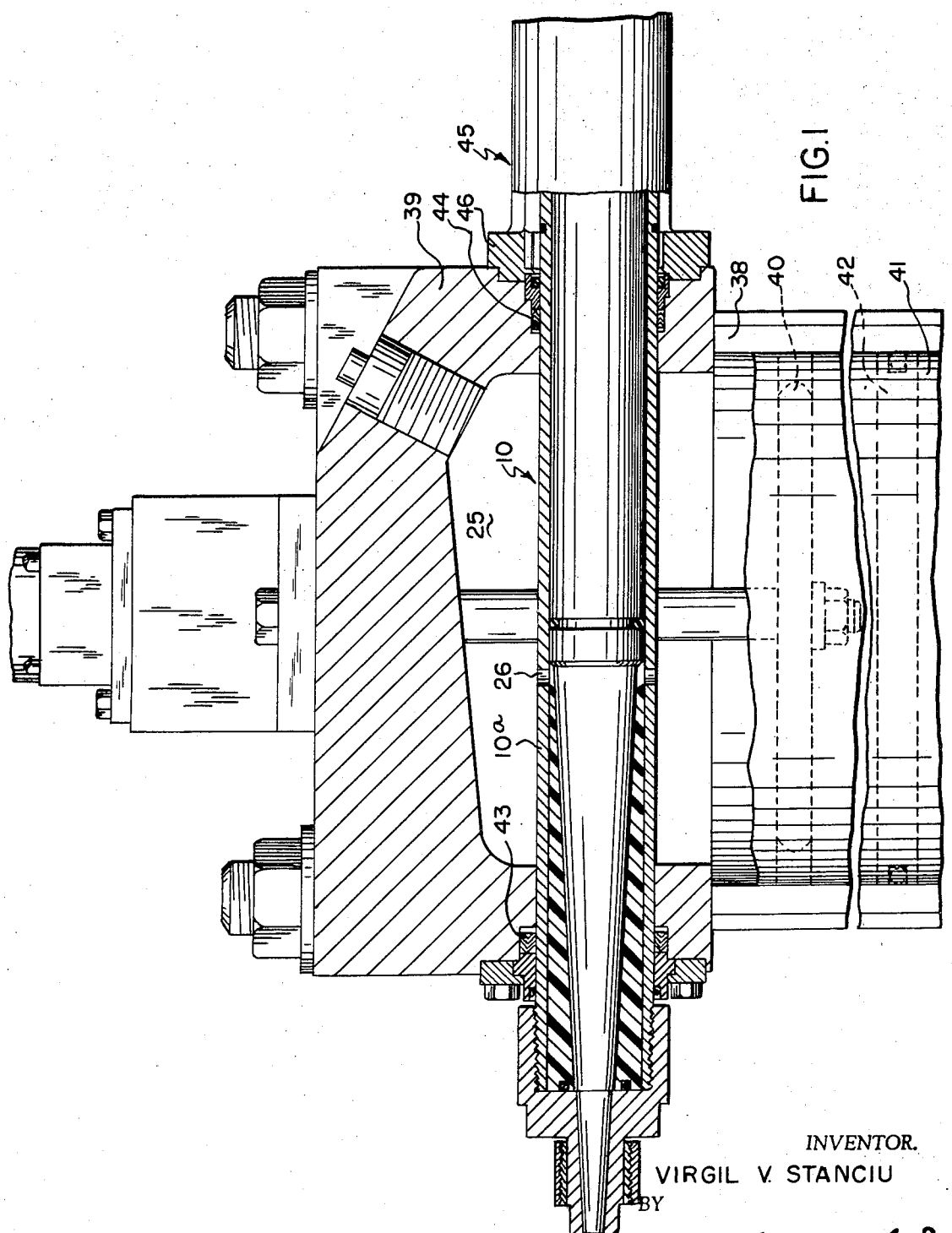
FIG. 1 is a sectional view showing a portion of the nozzle assembly of this invention slidably reciprocatable in a reservoir full of hot wax.
Figure 2:
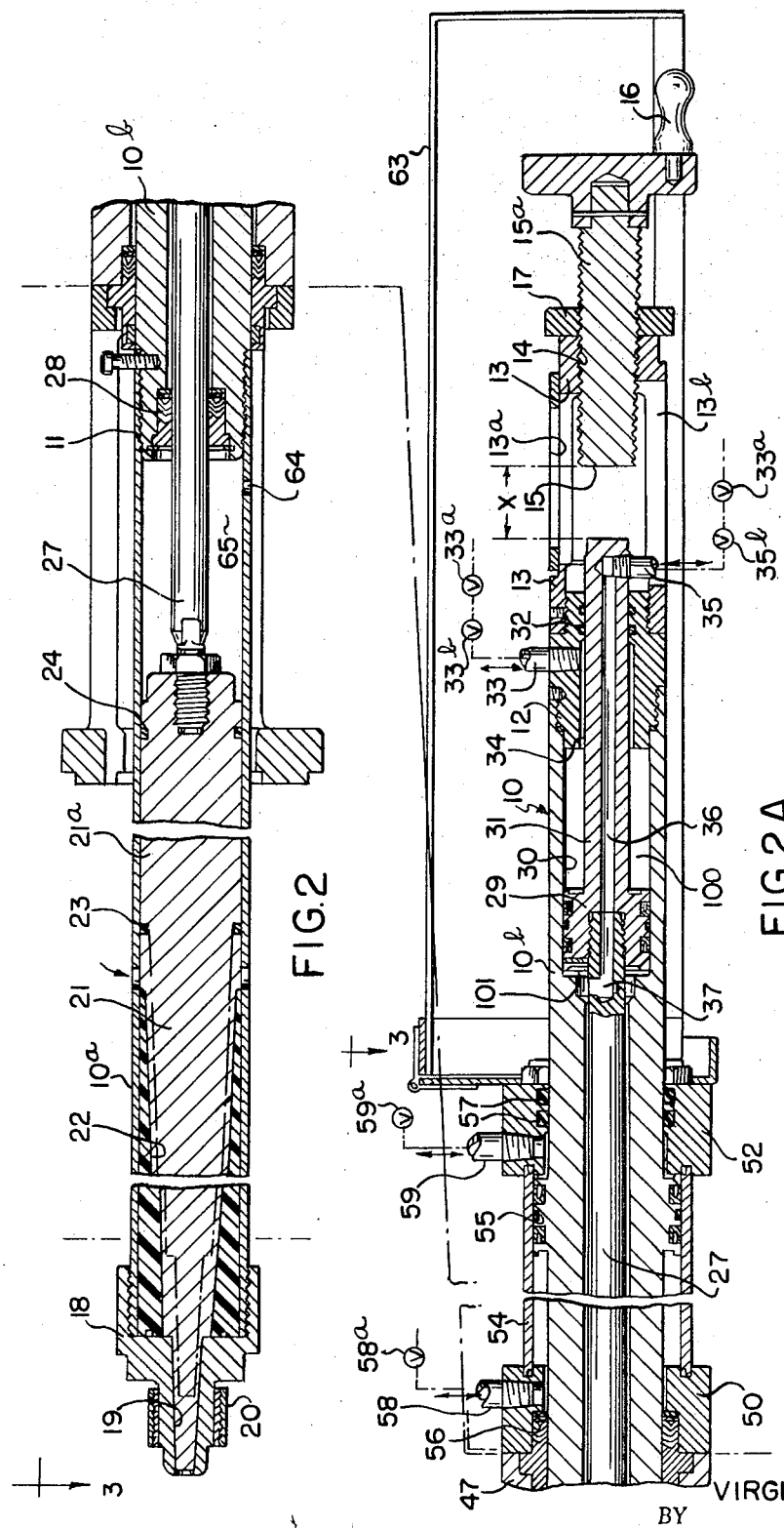

The nozzle assembly comprises an elongated, generally cylindrical housing 10 which includes at its forward end a thinner walled tubing 10a which is threaded at 11 to a thicker walled tubing 10b which has various diameter internal bores as will later appear. At the rear end of 10b, it is threaded into a rear fitting 12, at the other end of which there is threaded a stop support member 13 which carries an internal thread 14 to receive the thread 15a of a stop 15 which is rotatable by means of a handle 16 and locked in position by a lock washer 17. On the front end of the housing portion 10a, there is threaded a nozzle tip 18 having a discharge opening 19. Preferably a heater 20 is provided around the nozzle to keep it at the proper temperature. A valve for controlling the flow of the material through the nozzle 18 is shown in FIG. 2 in closed position in full lines and in open position in dot-dash lines. This valve includes a valve plug 21 of frusto-conical form converging toward the nozzle tip which seats in a coacting frusto-conical seat 22 which is preferably of castable material firmly held in position in the housing portion 10a in a manner shown in my copending application Ser. No. 824,824, filed May 15, 1969, the details of which need not be supplied here as it forms no part of the present invention. The rear portion of the plug at 21a is cylindrical and slidable in the housing tubular portion 10a and sealed therein as indicated at 23 and 24 by resilient O-rings. This valve is so constructed as to be opened and closed by movement of the valve plug axially of the housing 10 respectively away from and toward the outlet nozzle. In the open position of the valve plug as shown in dot-dash lines in FIG. 2, hot wax can flow from a reservoir 25 through openings 26 in housing portion 10a. This is clearly seen in FIG. 1 of the drawings.

Power means is provided in the housing 10 spaced from the nozzle 18 for causing smooth axial movement of the valve plug 21 between the closed position shown in full lines in FIG. 2 and an open position represented by the dot-dash lines thereof. The means here shown is a piston rod 27 threaded into the rear end of the valve plug 21 and extending concentric of the housing 10. Where the piston rod enters the central bore of the housing portion 10b a seal is provided at 28. At the rear end of the piston rod, as seen in FIG. 2A, a piston 29 is threaded on the rod and slidably fits into a bore 30 in the housing portion 10b with the usual sealing piston rings. A piston rod extension 31 continues on rearwardly, sealed in member 12 at 32, and terminates at its rear end in a position to engage the adjustable stop 15 when the piston 29 has completed the desired valve opening movement. Pressure fluid connections are provided for causing reciprocation of the piston 29. A combined inlet and outlet 33 for pressure fluid communicates through annular passage 34 with the right-hand face of piston 29 as seen in FIG. 2A. Another combined inlet and outlet for pressure fluid is provided at 35 which communicates through a passageway 36 in the piston rod extension 31, and through a connecting passageway 37 in the rear end of piston rod 27 to the left-hand face of piston 29 shown in the same drawing. Directional valve 33a is connected with lines 33 and 35, so that when one of the lines is opened to provide hydraulic fluid flow to piston 29, then the other line is opened to a return reservoir for the hydraulic actuating fluid. If desired, pressure controls may be provided for the pressure fluid so as to hold the exerted pressure at any desired level.

Hydraulic flow control valves 33b and 35b are provided in lines 33 and 35 respectively. Hydraulic flow control 33b controls the rate of hydraulic fluid flow being exhausted from chamber 100, thus controlling the velocity at which valve plug 21 opens. Hydraulic flow control 35b controls the rate of hydraulic fluid flow being exhausted from chamber 101, thus controlling the velocity at which valve plug 21 closes.

Figure 3:
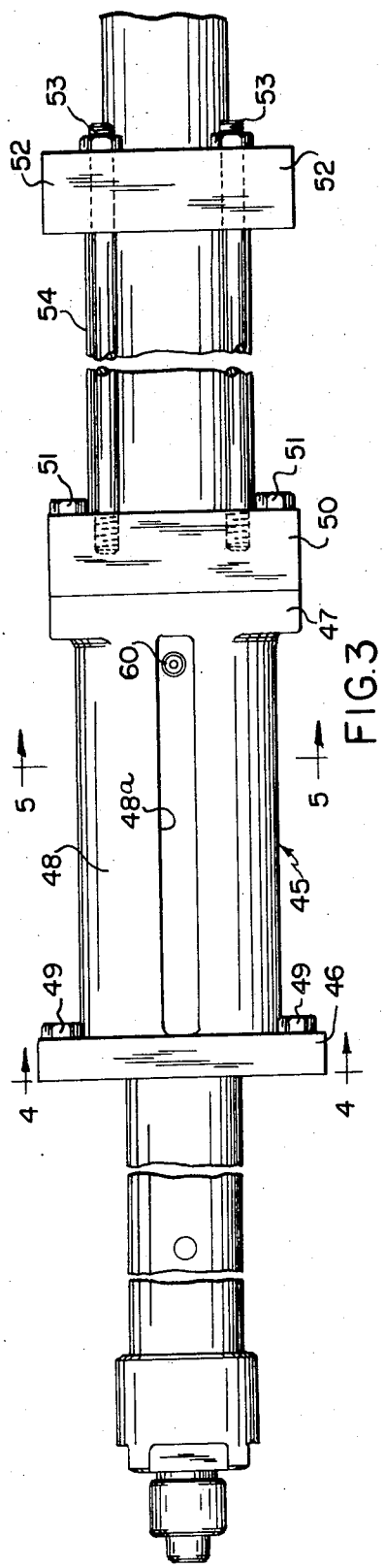
FIG. 3 is a top plan view of the same taken along the line 3—3 of FIGS. 2 and 2A.
Figure 5:
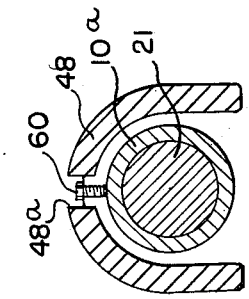
FIGS. 4 and 5 are sectional views taken along similarly numbered lines of FIG. 3.
Figure 4:
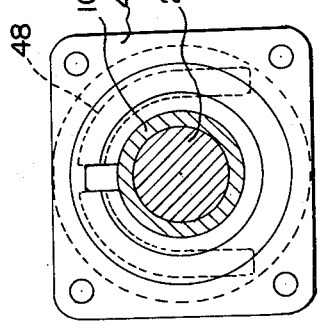

Stationary means is provided to support the housing 10 intermediate its ends for endwise movement of the housing relative thereto. The entire nozzle assembly is mounted for use in a manner quite similar to that shown in U.S. Pat. No. 3,535,743, granted Oct. 27, 1970 to Virgil V. Stanciu and Jack R. Peshek. The hot wax reservoir 38 is like reservoir 10 in the above-mentioned patent and it is closed at the top in an air-tight manner by a head 39 similar to the head 11 of the named patent. The hot wax is stored in the reservoir and agitated by means of agitator 40 in the same manner as described in connection with agitator 36 of the above named patent. The hot wax in the reservoir is kept under pressure by means of an upwardly moving piston 41, like the piston 29 of the patent, and a piston cap 42 like the cap 30 of the mentioned patent. Not shown in FIG. 1 is the means for applying pressure fluid beneath the piston 41 as shown in the chamber 31 of the above-mentioned patent. This allows the operator to apply whatever pressure is desired upon the hot wax in the chamber 25 by setting the controls of an hydraulic pump feeding line 23 of the above-mentioned patent. Where the housing 10 passes through the walls of the reservoir head 39, it is sealed against leakage at 43 and 44. The stationary means is shown more completely in FIGS. 2, 3, 4 and 5. A unitary casting 45 has end flanges 46 and 47, between which extends a generally inverted U-shape web member 48. The end flange is secured to the wall of the head 39 by bolts as indicated at 49 in FIG. 3.

At the right-hand end of the member 45, and secured rigidly thereto, is provided pressure fluid operated means for causing reciprocation of the complete nozzle assembly in the stationary means for movement longitudinally of the housing 10 in the wax reservoir head 39. This comprises a cylinder head 50 bolted to flange 47 at 51 and a second cylinder head 52 which is held firmly relative to the head 50 by means of tie bolts 53. Between the cylinder heads is firmly held a tubular portion 54 which provides a cylinder to cooperate with an annular piston 55 which is shown here extending radially outwardly from the housing portion 10b. This piston, of course, is sealed against the cylinder provided at 54. Leakage at opposite ends is prevented by seals 56 and 57. Combined pressure fluid inlets and outlets 58 and 59 are provided at opposite ends of the cylinder 54, in the cylinder heads 50 and 52, respectively, to provide pressure fluid against either of the faces of piston 55 while at the same time relieving the pressure against the opposed face. Valves 58a and 59a are provided respectively in the pressure fluid lines 58 and 59 to control the reciprocation of piston 55. Preferably, these two valves will be coordinated so that when one is open to pressure fluid, the other is open to return fluid to a pressure fluid reservoir. To prevent rotation of the housing 10 during its reciprocation, there is provided a longitudinal slot 48a in the top of the web member 48, into which extends a bolt 60, or other suitable projection, which permits endwise movement of the housing portion 10a while preventing rotation thereof.

The following variations are possible in the control of wax as it is discharged from the nozzle opening 19. Maximum wax flow is controlled by varying the distance which the valve plug 21 is permitted to open by adjusting the stop 15 at the rear end of the nozzle assembly by rotation of the same in its threaded nut 14 by means of the handle 16. This adjustment is checked through an opening 13a in the top of the member 13 and normally a calibration will be provided there for the guidance of the operator. In one form of this invention, increasing the opening valve distance increases the maximum possible flow up to three gallons of wax per minute.

Wax flow acceleration control is provided through the setting of valve 33a, changing the rate of flow of pressure fluid supplied through line 35 so as to increase or decrease the speed with which the piston 29 is moved toward the right in FIG. 2A.

The flow of wax can also be controlled by varying the pressure on the hot wax in the reservoir chamber 25 by means of the fluid supplied to push piston 41 upwardly in reservoir 38.

Figure 6:
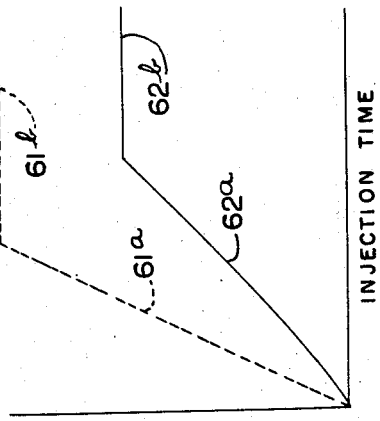

Referring to FIG. 6, the full line and broken line curves showing the rate of wax flow during a given injection time show rising curve portions 61a and 62a, the slope of which is varied by adjustment of the wax flow acceleration control. The curve portions 61b and 62b depend upon the maximum wax flow setting as determined by the stop 15.

Figure 7:
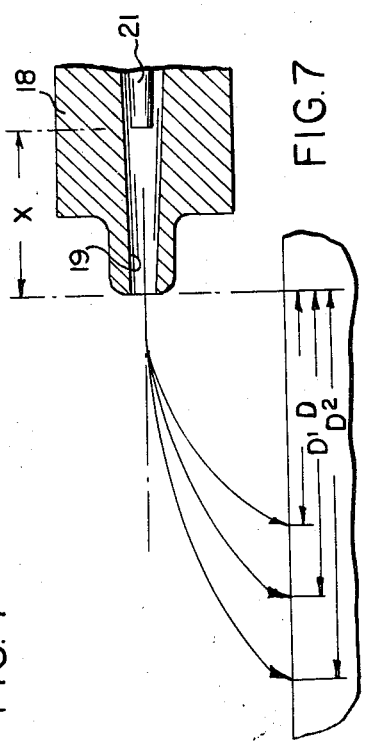
FIG. 7 is a diagram illustrating variation of the discharge of the stream of hot wax from the nozzle into the mold.

To illustrate the controls of the wax flow, refer to FIG. 7 and assume that the wax injection pressure in chamber 25 (FIG. 1) is 200 p.s.i., that the maximum wax flow adjustment permits opening of valve plug 21 (FIGS. 7 and 2A), and that the hydraulic flow control 35b is set at an arbitrarily calibrated flow rate of 10. With these settings, and without a die in position to be injected, one can observe the stream of wax emerging from the nozzle opening 18 which will move through the distance D during a time T. If the above settings are maintained all the same except that the hydraulic flow control 33b is increased to 15, the stream of wax which will move the same distance D, but this will occur during a time TI which will be less than the initial time T. This will increase the acceleration of wax flow but without any change in the maximum flow of wax. Again, assume all of the control settings are the same as in the first mentioned instance, but increase the maximum flow. Now it will be observed that the stream of wax will move the distance D1 during a time T2. Here T2 and D1 will both be larger than original T and D. Again, assuming all control settings as first set with the single change that the injection pressure in chamber 25 is increased to 250 p.s.i., then the stream of wax will move the distance D2 during the time T, at the end of which the maximum flow of wax has been increased.

Varying the adjustments possible with this invention allows a practically limitless variation of wax flow through the nozzle. With the "maximum wax flow" adjustment fully open and the "hydraulic flow control" on a low setting, a very slow acceleration from zero wax flow to maximum wax flow will occur. Increasing the "hydraulic flow control" setting will increase the acceleration, and the maximum wax flow will be reached in a shorter period of time. By decreasing the "maximum wax flow" setting, the maximum flow obtainable will be smaller. Once the correct setting for these adjustments has been determined for a particular die, the settings may be recorded, together with the injection pressure used, for all future uses of the same die. 63 represents a guard which may be placed over the rear end of the nozzle assembly.

64 as seen in FIG. 2 may be a weep hole provided to be sure that no liquid collects in the chamber 65.

It will be noted that the member 13 in FIG. 2A is open at 13b so as to permit free movement of an inlet hose 35 during reciprocation of the piston rod extension 31.

The operation of this device is very simple. With the parts assembled as shown in the various views, and with hot wax under a predetermined pressure in the chamber 25, pressure fluid is introduced at 59 and relieved at 58 to cause the piston 55 to move toward the left in FIG. 2A, thus carrying the entire nozzle assembly including portions 10a and 10b toward the left as viewed in the drawings to cause the nozzle 18 to engage a die or mold to be injected. With the stop 15 adjusted as above described, and with the wax flow acceleration control set at 33b to cause the piston 29 to open the valve plug 21 at the desired rate of speed, an injection may be accomplished. By maintaining the same fixed pressure in chamber 25, and the same maximum wax flow setting by the stop 15, and the same hydraulic flow control by the setting of valve 33b to determine the acceleration of valve plug 21 from zero to maximum flow, one may repeat substantially identical injections of the same die with great accuracy.

What Is Claimed Is:

1. A nozzle assembly for injecting a flowable and moldable material into a die, comprising an elongated generally cylindrical housing having a nozzle tip with a discharge opening at one end, a material control valve in said housing having an outlet communicating with said discharge opening and having a material inlet spaced upstream of said housing relative to said outlet, said valve being so constructed as to be opened and closed by movement of one portion of said valve axially of said housing respectively away from and toward said outlet, means in said housing spaced from said outlet for causing said axial movement of said one portion of said valve, stationary means supporting said housing intermediate the ends for endwise movement of said housing relative to said stationary means, a portion of said housing being reciprocatably slidable in said stationary means, and power means operatively connected between said portion of said housing and said stationary means for so reciprocating said housing.

2. A nozzle assembly as defined in claim 1, including adjustable stop means carried by said housing for limiting said movement of said one portion of said valve away from said outlet.

3. A nozzle assembly as defined in claim 1, wherein said stationary means is rigid with a wall of a hot wax reservoir, and said material inlet is submerged in wax-receiving position in hot wax in said reservoir, together with means for varying the pressure on said hot wax in said reservoir.

4. A nozzle assembly as defined in claim 1, wherein said stationary means includes a tubular portion spaced radially outside and concentric with said slidable portion of said housing, and said power means includes an annular piston rigid with said housing portion and sealed against said tubular portion and means for applying pressure fluid effective selectively against either face of said annular piston for reciprocating said housing in said stationary means.

5. A nozzle assembly as defined in claim 1, wherein said material control valve comprises a frusto-conical seat rigid with said housing and having walls converging toward said nozzle tip and said movable valve portion is a frusto-conical plug having an outer surface complementary to said walls of said seat.

6. A nozzle assembly as defined in claim 5, wherein said plug has a piston rod connected to its rear end remote from said nozzle tip, said rod extending rearwardly concentric with said housing and said means for causing axial movement of said one portion of said valve including a valve control piston at the rear end of said rod reciprocatable in said housing and means for supplying pressure fluid to operate said piston.

7. A nozzle assembly as defined in claim 6, including a valve control piston extension extending rearward therefrom, and a stop adjustable axially of said housing in position to be engaged by said extension upon rearward, valve-opening movement thereof, whereby the extent of valve opening may be repeatedly controlled uniformly.

8. A nozzle assembly as defined in claim 7, including a passageway in said extension in communication with the valve opening face of said valve control piston, said passageway terminating adjacent the rearward end of said extension, and there being an opening through said housing there permitting access of a pressure fluid conduit to said passageway terminal throughout said valve-opening movement of said valve control piston.

9. A nozzle assembly as defined in claim 7, including an enclosed hot wax reservoir, means for varying the pressure on wax in said reservoir, said stationary means is rigid with a wall of said reservoir, and said material inlet is submerged in wax-receiving position in hot wax in said reservoir.

10. A nozzle assembly as defined in claim 9, including means for varying the rate of movement of said valve plug in valve-opening direction.

11. A nozzle assembly as defined in claim 1, including means for varying the rate of axial movement of said one portion of said valve in valve-opening direction.

12. A nozzle assembly as defined in claim 1, including adjustable stop means carried by said housing for limiting said movement of said one portion of said valve away from said outlet for maximum wax flow, said means for causing said axial movement of said one portion of said valve away from said outlet comprises a pressure-fluid-actuated cylinder and piston motor control means for setting said pressure fluid flow to said last named motor at a desired setting, and with said housing submerged in a hot wax reservoir with said material inlet in wax-receiving position is said hot wax and with said hot wax at a predetermined pressure, whereby substantially identical injections of the same die may be repeated successively.

* * * * *